(12) United States Patent
Lee et al.

(10) Patent No.: US 9,933,275 B2
(45) Date of Patent: Apr. 3, 2018

(54) NAVIGATION DEVICE WITH AUTO MIRRORING FUNCTION AND COMPUTER READABLE RECORDING MEDIUM STORING METHOD OF AUTO MIRRORING

(71) Applicant: HYUNDAI MOTOR COMPANY, Seoul (KR)

(72) Inventors: Yong Ki Lee, Incheon (KR); Jin Young You, Seoul (KR); Kang Ju Cha, Seoul (KR); Jang Yong Lee, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/377,220

(22) Filed: Dec. 13, 2016

(65) Prior Publication Data
US 2017/0363439 A1 Dec. 21, 2017

(30) Foreign Application Priority Data
Jun. 21, 2016 (KR) .......................... 10-2016-0077222

(51) Int. Cl.
*G01C 21/26* (2006.01)
*G06F 3/14* (2006.01)
(Continued)

(52) U.S. Cl.
CPC ......... *G01C 21/3688* (2013.01); *G01C 21/30* (2013.01); *G06F 3/1454* (2013.01)

(58) Field of Classification Search
CPC .... G01C 21/3688; G01C 21/30; G06F 3/1454
See application file for complete search history.

(56) References Cited

U.S. PATENT DOCUMENTS 9,438,948 B1* 9/2016 Ryu .................. H04N 21/41422
2014/0307040 A1* 10/2014 Choi ...................... H04W 4/046
348/14.01
(Continued)

FOREIGN PATENT DOCUMENTS

JP 2014-085116 A 5/2014
KR 10-2012-0035381 A 4/2012
(Continued)

OTHER PUBLICATIONS

Released 'Pontus P680M', a new concept mirroring navigation, Internet article, Dec. 29, 2014, pp. 1-4 and pp. 1-2.

*Primary Examiner* — Michael J Zanelli
(74) *Attorney, Agent, or Firm* — McDermott Will & Emery LLP

(57) ABSTRACT

A navigation device with the auto mirroring function includes: a first driving route calculator configured to collect a current position and a destination of the vehicle and to calculate a first driving route corresponding to the current position and the destination by using previously stored map information; a mirroring determinator configured to determine whether mirroring is required based on a predetermined mirroring condition; a start signal transmitter configured to transmit a navigation application start signal to the mobile device when it is determined that the mirroring is required; and a mirroring controller configured to receive and mirror a second driving route transmitted from the mobile device.

17 Claims, 3 Drawing Sheets

(51) Int. Cl.
    *G01C 21/30*    (2006.01)
    *G01C 21/36*    (2006.01)

(56) References Cited

U.S. PATENT DOCUMENTS

| | | | | |
|---|---|---|---|---|
| 2014/0350833 | A1* | 11/2014 | Park | H04W 4/02 |
| | | | | 701/123 |
| 2015/0088421 | A1* | 3/2015 | Foster | G01C 21/3661 |
| | | | | 701/537 |
| 2015/0234665 | A1* | 8/2015 | Matsuyuki | G06F 9/445 |
| | | | | 701/36 |
| 2016/0034238 | A1* | 2/2016 | Gerlach | G06F 3/04817 |
| | | | | 345/1.1 |

FOREIGN PATENT DOCUMENTS

| KR | 10-2015-0063717 A | 6/2015 |
|---|---|---|
| KR | 10-1537694 B1 | 7/2015 |

* cited by examiner

NAVIGATION DEVICE WITH AUTO MIRRORING FUNCTION AND COMPUTER READABLE RECORDING MEDIUM STORING METHOD OF AUTO MIRRORING

CROSS-REFERENCE TO RELATED APPLICATION

This application claims the benefit of priority to Korean Patent Application No. 10-2016-0077222 filed in the Korean Intellectual Property Office on Jun. 21, 2016, the entire content of which is incorporated herein by reference.

TECHNICAL FIELD

The present disclosure relates to a vehicular navigation device with an auto mirroring function and a computer readable recording medium storing a method of the auto mirroring that automatically transmits and receives driving information to and from a navigation application installed in a mobile device of a driver and performs mirroring for a driving route transmitted from the mobile device.

BACKGROUND

Recently, a vehicle driver uses a navigation application installed in a portable terminal as well as a navigation device installed in a vehicle for the fastest and safest route to a destination. When the navigation device installed in the vehicle and the navigation application installed in the portable terminal are connected and used through wired and wireless communications, it is possible to improve readability by displaying the fastest and safest route in which recent traffic information received to the portable terminal is included on a large screen of the navigation device installed in the vehicle.

In general, the vehicle driver uses only the navigation device installed in the vehicle at the time of starting the vehicle, but while he/she drives the vehicle on a traffic congested road, in a state in which a GPS signal is not received by the navigation device, or in a state in which a route is not searched by the navigation device, he/she operates the portable terminal to use the navigation application of the portable terminal. In addition, while the vehicle driver drives while using the navigation application of the portable terminal even in the time of starting the vehicle, if he/she decides that readability of the portable terminal is low to an inconvenient degree, he/she may try to connect the portable terminal and the navigation device installed in the vehicle for mirroring therebetween.

However, operating the portable terminal is dangerous while the vehicle is being driven, and the navigation device installed in the vehicle and the portable terminal should be respectively operated to link therebetween.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a navigation device with an auto mirroring function and a computer readable recording medium storing a method of the auto mirroring that may control a navigation application installed in a mobile device of a driver depending on a driving route calculated based on a current position and a destination of a vehicle.

The present disclosure has also been made in an effort to provide a navigation device with an auto mirroring function and a computer readable recording medium storing a method of the auto mirroring that may receive a driving route transmitted from a navigation application installed in a mobile device of a driver to automatically perform mirroring.

In addition to the above-mentioned objects, an exemplary embodiment of the present disclosure may be used for other objects that are not mentioned in detail.

According to an exemplary embodiment of the present disclosure, a navigation device with an auto mirroring function of a vehicle, wherein the navigation device with the auto mirroring function may be connected with a mobile device in which a navigation application is installed through a wired or wireless communication network, the navigation device with the auto mirroring function including: a driving route calculator configured to collect a current position and a destination of the vehicle and to calculate a first driving route corresponding to the current position and the destination by using previously stored map information; a mirroring determinator configured to determine whether mirroring is required based on a predetermined mirroring condition; a start signal transmitter configured to transmit a navigation application start signal to the mobile device when it is determined that the mirroring is required; and a mirroring controller configured to receive and mirror a second driving route transmitted from the mobile device.

The mirroring determinator may determine that the mirroring is required in at least one of cases in which the current position of the vehicle is not included in the first driving route, in which at least one of road information, building information, and infrastructure information corresponding to the current position of the vehicle is not included in the first driving route, in which the first driving route is not calculated, in which the destination is not searched in the map information, and in which the navigation device is not activated.

The mirroring determinator may compare a version of map information corresponding to the first driving route and a version of map information corresponding to the second driving route, and may determine that the mirroring is required when the version of map information corresponding to the second driving route is newer than the version of map information corresponding to the first driving route.

The mirroring determinator may determine that the mirroring is not required when similarity between the first driving route and the second driving route is greater than a predetermined reference value.

The navigation device with the auto mirroring function may further include a finish signal transmitter configured to transmit a navigation application finish signal to the mobile device when it is determined that the mirroring is not required.

The navigation application start signal may include the collected destination.

The navigation device with the auto mirroring function may further include a mirroring database configured to store a position of the vehicle at the time when the navigation application start signal is transmitted, and the version of the map information.

The mirroring determinator may determine that the mirroring is required when the current position of the vehicle is within a predetermined radius based on a position of the vehicle stored in the mirroring database.

The mobile device may calculate the second driving route through the navigation application when the navigation application start signal is received.

When a plurality of navigation applications are provided, the mobile device may activate the newest navigation application to calculate the second driving route.

According to another exemplary embodiment of the present disclosure, a computer readable recording medium having embodied thereon a program for executing an auto mirroring method using a navigation device of a vehicle connected with a mobile device in which a navigation application is installed through a wired or wireless communication network. The method includes steps of: collecting a current position and a destination of the vehicle; calculating a first driving route corresponding to the collected current position and destination by using previously stored map information; determining whether mirroring is required based on a predetermined mirroring condition; transmitting a navigation application start signal to the mobile device when it is determined that the mirroring is required; and receiving and mirror a second driving route transmitted from the mobile device.

The step of determining whether the mirroring is required may determine that the mirroring is required in at least one of cases in which the current position of the vehicle is not included in the first driving route, in which at least one of road information, building information, and infrastructure information corresponding to the current position of the vehicle is not included in the first driving route, in which the first driving route is not calculated, in which the destination is not searched in the map information, and in which the navigation device is not activated.

The step of determining whether the mirroring is required may compare a version of map information corresponding to the first driving route and a version of map information corresponding to the second driving route, and may determine that the mirroring is required when the version of map information corresponding to the second driving route is newer than the version of map information corresponding to the first driving route.

The step of determining whether the mirroring is required may determine that the mirroring is not required when similarity between the first driving route and the second driving route is greater than a predetermined reference value.

The method may further include transmitting a navigation application finish signal to the mobile device when it is determined that the mirroring is not required.

The method may further include storing a position of the vehicle at the time when the navigation application start signal is transmitted, and the version of the map information.

The step of determining whether the mirroring is required may determine that the mirroring is required when the current position of the vehicle is within a predetermined radius based on a position of the vehicle that is previously stored.

According to the embodiments of the present disclosure, a driver does not need to directly operate a vehicular navigation device or a mobile device while driving a vehicle. In addition, according to the embodiments of the present disclosure, it is possible to reduce risk of accidents due to operation of a vehicular navigation device or a mobile device while driving a vehicle by automatically connecting the vehicular navigation device and the mobile device.

DETAILED DESCRIPTION OF THE EMBODIMENTS

Figure 1:
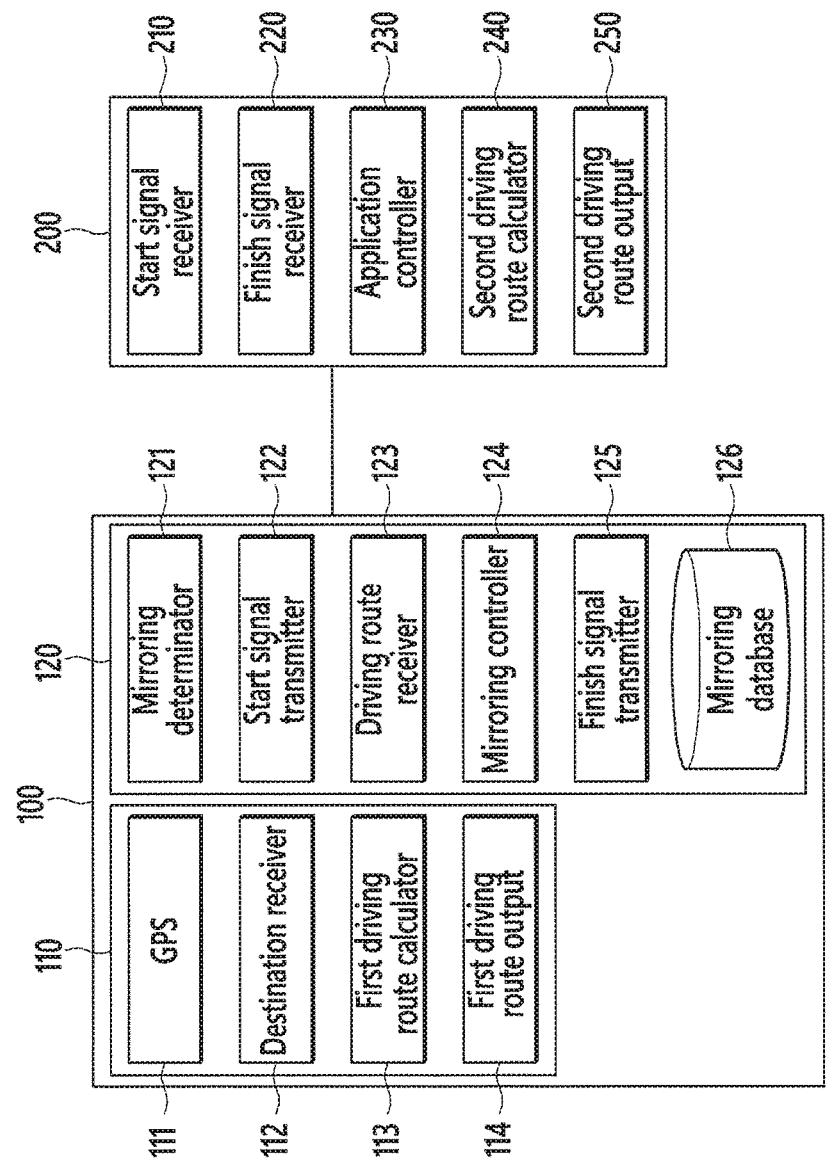
FIG. 1 illustrates a block diagram of a navigation device according to an exemplary embodiment of the present disclosure.

Hereinafter, exemplary embodiments of the present disclosure will be described in detail with reference to the accompanying drawings so as to be easily practiced by a person skilled in the art to which the present disclosure pertains. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification. In addition, the detailed description of widely known technologies will be omitted.

In the present specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function or operation, and can be implemented by hardware components or software components or combinations thereof.

In the specification, a "mobile device" (or "mobile terminal") means a portable device such as a cellular phone, a personal digital assistant (PDA), a smartphone, a laptop computer, a wearable device, and the like, which may provide a data communication service.

In the specification, a "navigation device" means a telematics terminal or an audio video navigation (AVN) which may be installed in a vehicle or may be detachable according to needs of a user, and it may perform a mirroring function that displays a screen of a mobile device that is paired.

Throughout the specification, it is assumed that a navigation device is paired with a mobile device, and a navigation application is installed in the mobile device.

FIG. 1 illustrates a block diagram of a navigation device according to an exemplary embodiment of the present disclosure.

As shown in FIG. 1, a navigation device 100 includes a route guidance device 110 that calculates and outputs a driving route corresponding to a current position and a destination of a vehicle, and a mirroring device 120 that receives and mirrors a driving route transmitted from a mobile device 200 based on a driving situation of the vehicle.

The route guidance device 110 includes a global positioning system (GPS) 111, a destination receiver 112, a first driving route calculator 113, and a first driving route output 114.

The GPS 111 collects current position information of a vehicle in which the navigation device 100 is installed.

The destination receiver 112 receives destination information which a driver selects from a destination list that is inputted by the driver or is previously stored.

The first driving route calculator 113 calculates a first driving route based on the current position information collected in real time through the GPS 111, the destination information received through the destination receiver 112, and previously stored map information. In this case, the first driving route calculator 113 may calculate the first driving route reflecting Transport Protocol Experts Group (TPEG) traffic information.

The first driving route output 114 outputs the first driving route calculated by the first driving route calculator 113. For example, the first driving route output 114 outputs one or more of road information, building information, and infrastructure information within a predetermined radius based on the current position of the vehicle. Further, the first driving route output 114 may output a version of map information corresponding to the road information, the building information, and the infrastructure information. In addition, the first driving route output 114 may output a second driving route transmitted from the mobile device 200.

The mirroring device 120 includes a mirroring determinator 121, a start signal transmitter 122, a driving route receiver 123, a mirroring controller 124, a finish signal transmitter 125, and a mirroring database 126.

The mirroring determinator 121 determines whether to use mirroring based on a predetermined mirroring condition. In this case, the mirroring determinator 121 determines whether to use the mirroring only when a map version of the navigation application installed in the mobile device 200 is the same as a map version of the navigation device or is newer than the map version of the navigation device. If the map version of the navigation device is newer than the map version of the navigation application, the mirroring determinator 121 determines that the mirroring is not needed, and outputs a message that the mirroring may not be performed through the mirroring controller 124.

According to the exemplary embodiment of the present disclosure, the mirroring determinator 121 may determine the need of the mirroring according to whether the route guidance device 100 normally operates. For example, it may be determined that the mirroring is required in the case that the first driving route is not calculated through the first driving route calculator 113, the destination is not searched from the previously stored map information, the position information of the vehicle is not collected, or the driver selects the use of the navigation application installed in the mobile device (hereinafter referred to as a "navigation application").

According to the exemplary embodiment of the present disclosure, the mirroring determinator 121 determines whether the mirroring is required based on the real-time position information of the vehicle collected through the GPS 111 and the first driving route outputted through the first driving route output 114. For example, when the current position of the vehicle deviates from the first driving route for a predetermined time or more, or at least one of the road information, building information, and infrastructure information corresponding to the current position of the vehicle is not outputted through the first driving route output 114, it is determined that the mirroring is required.

According to the exemplary embodiment of the present disclosure, the mirroring determinator 121 determines whether the mirroring is required based on the current position of the vehicle. For example, when the current position of the vehicle is within the predetermined radius from a position stored in the mirroring database 126, it may be determined that the mirroring is required. In this case, the position stored in the mirroring database 126 is a position of the vehicle of when the mirroring is previously performed.

When it is determined through the mirroring determinator 121 that the mirroring is required, the start signal transmitter 122 transmits a navigation application start signal to the mobile device 200. In this case, the start signal includes the current position information of the vehicle information collected through the GPS 111 and destination information received through the destination receiver 112.

The driving route receiver 123 receives the second driving route transmitted from the mobile device 200 receiving the navigation application start signal.

The mirroring controller 124 mirrors the driving route received through the driving route receiver 123 through the driving route output 114. In addition, the mirroring controller 124 outputs a message guiding the fact that the second driving route is a driving route calculated by the navigation application. In this case, the guidance message may be outputted in one or more types of image, sound, and a predetermined alarm.

When it is determined through the mirroring determinator 121 that the mirroring is not required during the mirroring of the second driving route, the finish signal transmitter 125 transmits a navigation application finish signal to the mobile device 200. According to the exemplary embodiment of the present disclosure, the first driving route calculator 113 recalculates the first driving route during the mirroring of the second driving route, and when the recalculated first driving route does not satisfy a mirroring condition, the mirroring determinator 121 may determine that the mirroring is not required. When similarity between the recalculated first driving route and the second driving route that is being mirrored is greater than a predetermined value, the mirroring determinator 121 may determine that the mirroring is not required.

The mirroring database 126 stores a position of the vehicle and a version of the navigation device (e.g., a version of previously stored map information) at the time when the second driving route of the mobile device 200 is mirrored through the first driving route output 114. That is, when the current position of the vehicle is within a predetermined radius from a position stored in the mirroring database 126 and the versions of the map information are the same, the mirroring determinator 121 may determine that the mirroring is required.

The navigation device 100 of FIG. 1 is connected with the mobile device 200 through a wired or wireless communication network, and the mobile device 200 includes a start signal receiver 210, a finish signal receiver 220, an application controller 230, a second driving route calculator 240, and a second driving route output 250.

The start signal receiver 210 receives a start signal transmitted through the start signal transmitter 122. In this case, the start signal includes the current position information of the vehicle collected through the GPS 111 and the destination information received through the destination receiver 112. The current position information of the vehicle may be collected through the start signal receiver 210, or may be collected through a GPS (not shown in FIG. 1) of the mobile device 200 at the time when the start signal is received.

The finish signal receiver 220 receives a finish signal transmitted through the finish signal transmitter 125.

When the start signal is received through the start signal receiver 210, the application controller 230 searches a navigation application installed in the mobile device 200 to activate it. If a plurality of navigation applications are installed, the application controller 230 selects one of them according to a predetermined standard to activate it. For example, the application controller 23 compares versions of the plurality of navigation applications or versions of maps respectively corresponding to the plurality of navigation applications, and then selects the newest version of the navigation application to activate it. When it fails to activate the navigation application, the application controller 230 may transmit a guidance message with respect to this to the navigation device 100.

The second driving route calculator 240 is activated through the application controller 230, transmits the current position information and the destination information of the vehicle to a navigation server (not shown in FIG. 1), and receives the second driving route transmitted from the navigation server.

The second driving route output 250 outputs the driving route received through the second driving route calculator 240. Further, the second driving route output 250 transmits the second driving route received through the second driving route calculator 240 to the navigation device 100.

According to the exemplary embodiment of the present disclosure, the start signal receiver 210 and the finish signal receiver 220 may be implemented through a background controller application (BCA) installed in the mobile device 200, and the second driving route calculator 240 and the second driving route output 250 may be implemented through the navigation application.

According to the exemplary embodiment of the present disclosure, the navigation device 100 of FIG. 1 may be connected to a telematics server and a wireless communication network, and may transmit mirroring information stored in the mirroring database 126 to the telematics server. The telematics server may receive and store the mirroring information transmitted from the navigation device 100, and may transmit a mirroring guidance message to a corresponding vehicle in the case that it is detected that a position of a vehicle accessing the telematics server and a version of a navigation device thereof correspond to the received mirroring information.

The various embodiments disclosed herein, including the embodiments of the navigation device 100 and/or elements thereof and the mobile device 200 and/or elements thereof, can be implemented using one or more processors coupled to a memory (or other non-transitory machine readable recording medium) storing computer-executable instructions for causing the processor(s) to perform the functions described above including the functions described in relation to the GPS 111, the destination receiver 112, the first driving route calculator 113, the first driving route output 114, the mirroring determinator 121, the start signal transmitter 122, the driving route receiver 123, the mirroring controller 124, the finish signal transmitter 125, the mirroring database 126, the start signal receiver 210, the finish signal receiver 220, the application controller 230, the second driving route calculator 240, and the second driving route output 250.

Figure 2:
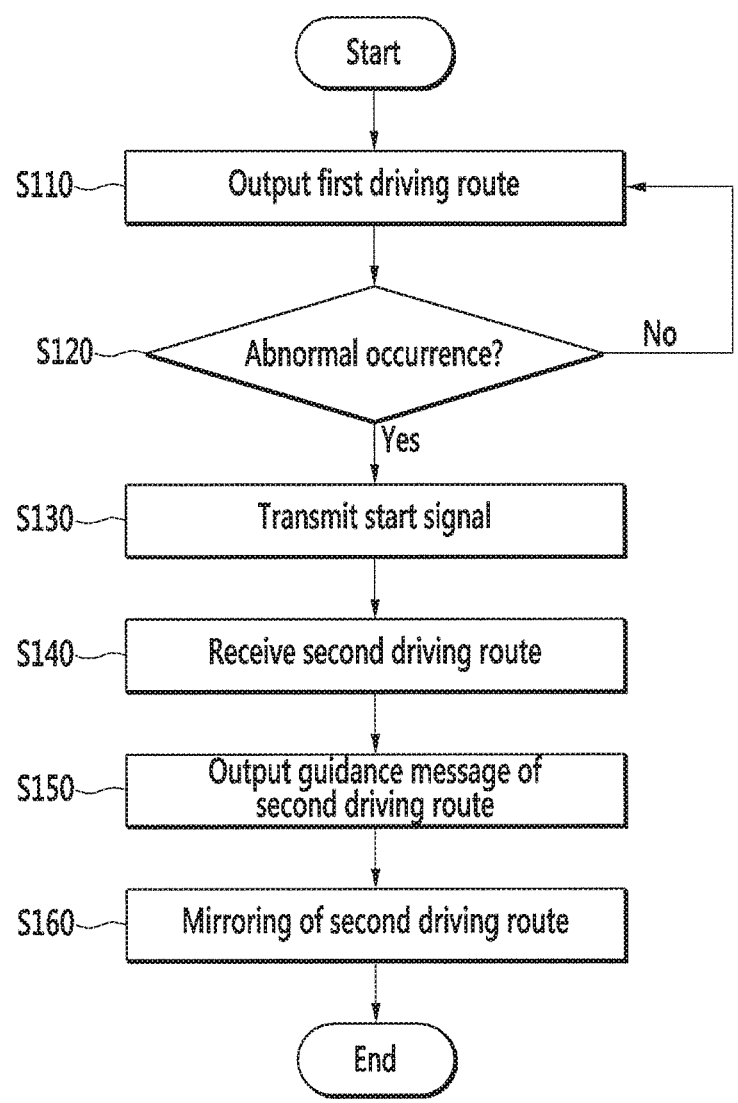
FIG. 2 illustrates a flowchart of a starting method of mirroring by the navigation device of FIG. 1.

FIG. 2 illustrates a flowchart of a starting method of mirroring by the navigation device of FIG. 1.

In FIG. 2, it is assumed that a first driving route is outputted through the first driving route output 114 (S110).

First, whether to perform mirroring is determined by detecting whether route guidance of the first driving route output in step S110 is abnormal through the mirroring determinator 121 (S120). According to the exemplary embodiment of the present disclosure, when the route guidance device 110 does not normally operate, for example, when a current position of the vehicle is not included in the first driving route outputted in step S110, the first driving route is not changed depending on a position change of the vehicle, a destination is not searched from the previously stored map information, or position information of the vehicle is not collected, it is determined that the mirroring is required. In addition, when the driver selects use of the navigation application, it may be determined that the mirroring is required.

When it is determined that the mirroring is required in step S120, a start signal is transmitted to the mobile device 200 through the start signal transmitter 122 (S130).

Next, a second driving route transmitted from the mobile device 200 through the mirroring controller 124 is received (S140), and a guidance message of the second driving route by the mobile device 200 is outputted (S150).

Subsequently, the second driving route received through the first driving route output 114 in step S140 is mirrored (S160).

Figure 3:
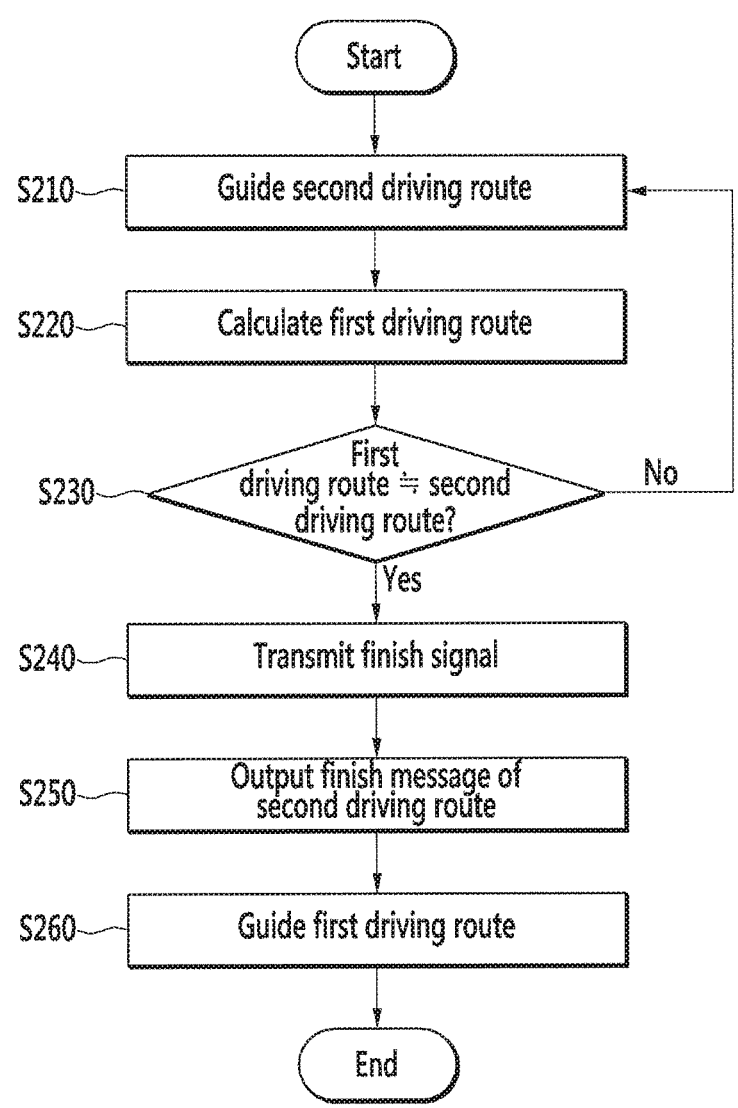
FIG. 3 illustrates a flowchart of a finishing method of mirroring by the navigation device of FIG. 1.

FIG. 3 illustrates a flowchart of a finishing method of mirroring by the navigation device of FIG. 1.

First, the second driving route is mirrored through the first driving route output 114 (S210), and the first driving route is calculated through the first driving route calculator 113 (S220).

Next, similarity between the first driving route calculated in step S220 and the second driving route mirrored in step S210 is calculated, and it is determined whether the calculated similarity exceeds a predetermined reference value (S230). According to the exemplary embodiment of the present disclosure, the similarity may be calculated by comparing the first driving route and the second driving route respectively having predetermined times or distances based on the current position of the vehicle.

When it is determined that the similarity between the first driving route and the second driving route exceeds the reference value in step S230, a finish signal is transmitted to the mobile device 200 through the finish signal transmitter 125 (S240), a guidance finish message of the second driving route by the mobile device 200 is outputted through the mirroring controller 124 (S250). In this case, when the finish signal transmitted from step S240 is received, the mobile device 200 stops operations of the second driving route calculator 240 and the second driving route output 250 through the application controller 230. In step S240, when the driver selects the stop of the use of the navigation application, the finish signal may be transmitted to the mobile device 200.

Next, the first driving route calculated in step S220 is outputted through the first driving route output 114 (S260).

According to the exemplary embodiment of the present disclosure, while the vehicle is driven, if a driving route is not normally provided by the navigation device thereof, the navigation application of the mobile device is automatically activated, thereby eliminating inconvenience according to directly operating the mobile device. Further, by determining the similarity between the first driving route calculated through the navigation device of the vehicle and the second driving route calculated through the navigation application of the mobile device, and by automatically finishing the mirroring of the second driving route, it is possible to reduce data communication costs. In addition, by mirroring the driving route calculated through the navigation application on the navigation device, it is possible to improve readability of the driving route.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A navigation device with an auto mirroring function of a vehicle, wherein the navigation device with the auto mirroring function is connected with a mobile device in which a navigation application is installed through a wired or wireless communication network, the navigation device comprising:
    a driving route calculator configured to collect a current position and a destination of the vehicle and to calculate a first driving route corresponding to the current position and the destination by using previously stored map information;
    a mirroring determinator configured to determine whether mirroring is required based on a predetermined mirroring condition;
    a start signal transmitter configured to transmit a navigation application start signal to the mobile device when it is determined that the mirroring is required; and
    a mirroring controller configured to receive and mirror a second driving route transmitted from the mobile device.

2. The navigation device of claim 1, wherein
    the mirroring determinator determines that the mirroring is required in at least one of cases in which the current position of the vehicle is not included in the first driving route, in which at least one of road information, building information, and infrastructure information corresponding to the current position of the vehicle is not included in the first driving route, in which the first driving route is not calculated, in which the destination is not searched in the map information, and in which the navigation device is not activated.

3. The navigation device of claim 1, wherein
    the mirroring determinator compares a version of map information corresponding to the first driving route and a version of map information corresponding to the second driving route, and determines that the mirroring is required when the version of map information corresponding to the second driving route is newer than the version of map information corresponding to the first driving route.

4. The navigation device of claim 1, wherein
    the mirroring determinator determines that the mirroring is not required when similarity between the first driving route and the second driving route is greater than a reference value.

5. The navigation device of claim 1, further comprising
    a finish signal transmitter configured to transmit a navigation application finish signal to the mobile device when it is determined that the mirroring is not required.

6. The navigation device of claim 1, wherein
    the navigation application start signal includes the collected destination.

7. The navigation device of claim 1, further comprising
    a mirroring database configured to store a position of the vehicle at the time when the navigation application start signal is transmitted, and the version of the map information.

8. The navigation device of claim 7, wherein
    the mirroring determinator determines that the mirroring is required when the current position of the vehicle is within a predetermined radius based on a position of the vehicle stored in the mirroring database.

9. The navigation device of claim 1, wherein
    the mobile device calculates the second driving route through the navigation application when the navigation application start signal is received.

10. The navigation device of claim 1, wherein
    when a plurality of navigation applications are provided, the mobile device activates the newest navigation application to calculate the second driving route.

11. A non-transitory computer readable recording medium having embodied thereon a program for executing an auto mirroring method using a navigation device of a vehicle connected with a mobile device in which a navigation application is installed through a wired or wireless communication network, the method comprising steps of:
    collecting a current position and a destination of the vehicle;
    calculating a first driving route corresponding to the collected current position and destination by using previously stored map information;
    determining whether mirroring is required based on a predetermined mirroring condition;
    transmitting a navigation application start signal to the mobile device when it is determined that the mirroring is required; and
    receiving and mirroring a second driving route transmitted from the mobile device.

12. The computer readable recording medium of claim 11, wherein
    the step of determining whether the mirroring is required determines that the mirroring is required in at least one of cases in which the current position of the vehicle is not included in the first driving route, in which at least one of road information, building information, and infrastructure information corresponding to the current position of the vehicle is not included in the first driving route, in which the first driving route is not calculated, in which the destination is not searched in the map information, and in which the navigation device is not activated.

13. The computer readable recording medium of claim 11, wherein
    the step of determining whether the mirroring is required compares a version of map information corresponding to the first driving route and a version of map information corresponding to the second driving route, and determines that the mirroring is required when the version of map information corresponding to the second driving route is newer than the version of map information corresponding to the first driving route.

14. The computer readable recording medium of claim 11, wherein
    the step of determining whether the mirroring is required determines that the mirroring is not required when similarity between the first driving route and the second driving route is greater than a reference value.

15. The computer readable recording medium of claim 11, further comprising a step of:

transmitting a navigation application finish signal to the mobile device when it is determined that the mirroring is not required.

16. The computer readable recording medium of claim 11, further comprising a step of:

storing a position of the vehicle at the time when the navigation application start signal is transmitted, and a version of the map information.

17. The computer readable recording medium of claim 16, wherein the step of determining whether the mirroring is required determines that the mirroring is required when the current position of the vehicle is within a predetermined radius based on a position of the vehicle that is previously stored.

* * * * *